(12) United States Patent
Nishida et al.

(10) Patent No.: US 9,506,814 B2
(45) Date of Patent: Nov. 29, 2016

(54) MOUNTING CLIP FOR BATTERY TEMPERATURE SENSOR

(71) Applicant: NIFCO INC., Yokohama-shi, Kanagawa (JP)

(72) Inventors: Ryuhei Nishida, Yokohama (JP); Naoyuki Masuda, Utsunomiya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 386 days.

(21) Appl. No.: 14/347,846

(22) PCT Filed: Oct. 5, 2012

(86) PCT No.: PCT/JP2012/075904
§ 371 (c)(1),
(2) Date: Mar. 27, 2014

(87) PCT Pub. No.: WO2013/051683
PCT Pub. Date: Apr. 11, 2013

(65) Prior Publication Data
US 2014/0233606 A1    Aug. 21, 2014

(30) Foreign Application Priority Data
Oct. 5, 2011   (JP) ................. 2011-221282

(51) Int. Cl.
*G01K 1/00*    (2006.01)
*G01K 7/00*    (2006.01)
(Continued)

(52) U.S. Cl.
CPC .............. *G01K 1/14* (2013.01); *H01M 10/486* (2013.01); *F16B 21/075* (2013.01)

(58) Field of Classification Search
USPC ................................ 374/208, 152, 183, 148
See application file for complete search history.

(56) References Cited

U.S. PATENT DOCUMENTS 1,828,170 A * 10/1931 Bristol .................... G01K 1/14
136/232
4,179,309 A * 12/1979 Hance .................... G01K 7/025
136/232
(Continued)

FOREIGN PATENT DOCUMENTS

DE            19737821 A1    3/1998
JP            S60-145770 U   9/1985
(Continued)

OTHER PUBLICATIONS

Europe Patent Office, "Search Report for EP 12838698.4," Apr. 21, 2015.
(Continued)

*Primary Examiner* — Mirellys Jagan
(74) *Attorney, Agent, or Firm* — Manabu Kanesaka

(57) ABSTRACT

A mounting clip for a battery temperature sensor holds a temperature sensor including a sensor main body and a projection portion, and is mounted to a mounting hole of a battery case. The clip includes a holding portion allowing the temperature sensor to be internally inserted and held; a leg portion hanging from the holding portion, allowing the temperature sensor to pass through, and allowing to be inserted into the mounting hole; and an engagement portion protruding from the leg portion, to be engaged with the case when inserted into the mounting hole. In the clip, an operation portion extending from the engagement portion, and allowing an engagement of the engagement portion with the case to be released, is provided.

4 Claims, 16 Drawing Sheets

(51) Int. Cl.
  *G01K 13/00* (2006.01)
  *G01K 1/14* (2006.01)
  *H01M 10/48* (2006.01)
  *F16B 21/07* (2006.01)

(56) References Cited

U.S. PATENT DOCUMENTS

| | | | | |
|---|---|---|---|---|
| 5,342,126 | A * | 8/1994 | Heston | G01K 1/14 |
| | | | | 24/DIG. 53 |
| 5,733,044 | A * | 3/1998 | Rose | G01K 13/02 |
| | | | | 374/144 |
| 5,945,606 | A | 8/1999 | Tokunaga et al. | |
| 7,438,988 | B2 * | 10/2008 | Misu | H01M 2/0285 |
| | | | | 320/107 |
| 7,574,921 | B2 * | 8/2009 | Fessele | G01L 19/0007 |
| | | | | 73/756 |
| 9,261,413 | B2 * | 2/2016 | Nishida | G01K 1/14 |
| 2004/0165648 | A1 | 8/2004 | Ikeda et al. | |
| 2004/0261552 | A1 | 12/2004 | Grundmann et al. | |
| 2005/0155442 | A1 * | 7/2005 | Grundmann | G01D 11/245 |
| | | | | 73/866.5 |
| 2005/0175066 | A1 * | 8/2005 | Nakabayashi | G01K 13/02 |
| | | | | 374/148 |
| 2010/0054303 | A1 | 3/2010 | Wakabayashi | |
| 2011/0044374 | A1 * | 2/2011 | Bergeron | G01K 1/08 |
| | | | | 374/208 |

FOREIGN PATENT DOCUMENTS

| | | |
|---|---|---|
| JP | H10-302847 A | 11/1998 |
| JP | 2010-281787 A | 12/2010 |
| WO | 2012/102279 A1 | 8/2012 |

OTHER PUBLICATIONS

PCT, International Search Report for PCT/JP2012/075904.

* cited by examiner

MOUNTING CLIP FOR BATTERY TEMPERATURE SENSOR

FIELD OF TECHNOLOGY

The present invention relates to a mounting clip for a battery temperature sensor, wherein by operating a release operation portion, the clip can be easily removed to improve maintenance ability of a battery.

BACKGROUND ART

Conventionally, there is known a battery structure for an electric car provided with a temperature sensor unit (for example, see paragraph [0034], FIGS. 1, and 6 to 8 in Patent Document 1).

A conventional temperature sensor unit is formed by a cylindrical unit main body including a screw portion screwed into a sensor mounting hole of an upper wall of a battery case to be fixed; a temperature detection portion slidably disposed on an inner side of the unit main body, and made of synthetic resin; a temperature sensor disposed inside an end portion of the temperature detection portion; and a spring elastically installed inside the unit main body to urge the temperature detection portion in a direction of protruding from the unit main body (for example, see paragraph [0034] in the Patent Document 1).

PRIOR ART DOCUMENT

Patent Document

Patent Document 1: Japanese Unexamined Patent Publication No. H10-302847

SUMMARY OF THE INVENTION

Problems to be Solved by the Invention

The temperature sensor unit of the aforementioned conventional battery structure for an electric car, however, has to be screwed into the sensor mounting hole, and requires a tool at a time of mounting. Also, there is a problem that mounting is cumbersome and takes time.

Also, since the temperature sensor for the battery requires an accurate mounting, in the aforementioned conventional temperature sensor unit, the temperature detection portion is urged in the direction of protruding using the spring. Consequently, the conventional temperature sensor unit has a problem that a large number of parts is required, and the structure is complicated.

Therefore, the present invention is made in view of the problems which the aforementioned conventional technology has, and an object of the present invention is to allow the clip to be easily removed by operating the release operation portion, and to improve the maintenance ability of the battery.

Means for Solving the Problems

The present invention is made in order to attain the aforementioned object, and the present invention has the following characteristics.

First, the present invention is a mounting clip for a battery temperature sensor holding a temperature sensor including a sensor main body and a projection portion projecting from the sensor main body, and mounted to a mounting hole of a battery case.

Secondly, the clip comprises the following structure.

(1) Holding Portion

A holding portion can internally insert and hold a temperature sensor.

(2) Leg Portion

A leg portion hangs from the holding portion, allows the temperature sensor to pass through, and can be inserted into the mounting hole.

(3) Engagement Portion

An engagement portion protrudes from the leg portion, and when inserted into the mounting hole, the engagement portion can be engaged with the case.

Thirdly, in the clip, there is provided an operation portion extending from the engagement portion, and allowing an engagement of the engagement portion with the case to be released.

The present invention may have the following characteristic.

Namely, at a time of release operation by the operation portion, a connection portion between the operation portion and the engagement portion holds the projection portion of the temperature sensor. In this case, when the clip is removed, in a state of holding the temperature sensor, the temperature sensor can be removed together with the clip.

The present invention may have the following characteristic.

Namely, in the holding portion, there is included a slit formed along an insertion direction of the temperature sensor. In this case, when the temperature sensor is installed in the holding portion of the clip, through the slit, the holding portion can be pushed open so as not only to improve installing ability of the temperature sensor, but also to allow the slit to be used for a wiring of the temperature sensor.

The present invention may have the following characteristic.

Namely, in an inner circumferential face of the holding portion, there is included a protrusion extending along the insertion direction of the temperature sensor. In this case, the protrusion of the inner circumferential face of the holding portion can not only be used as a guide at a time of installing the temperature sensor, but also can prevent wobbling after an install.

The present invention may have the following characteristic.

Namely, in the inner circumferential face of the holding portion, there is included a locking portion locking the projection portion of the temperature sensor. In this case, the locking portion of the inner circumferential face of the holding portion not only can provide moderate feeling at the time of installing the temperature sensor, but also can retain the temperature sensor after the install.

Effect of the Invention

According to the present invention, by operating a release operation portion, the clip can be easily removed so as to improve maintenance ability of a battery.

Figure 1:
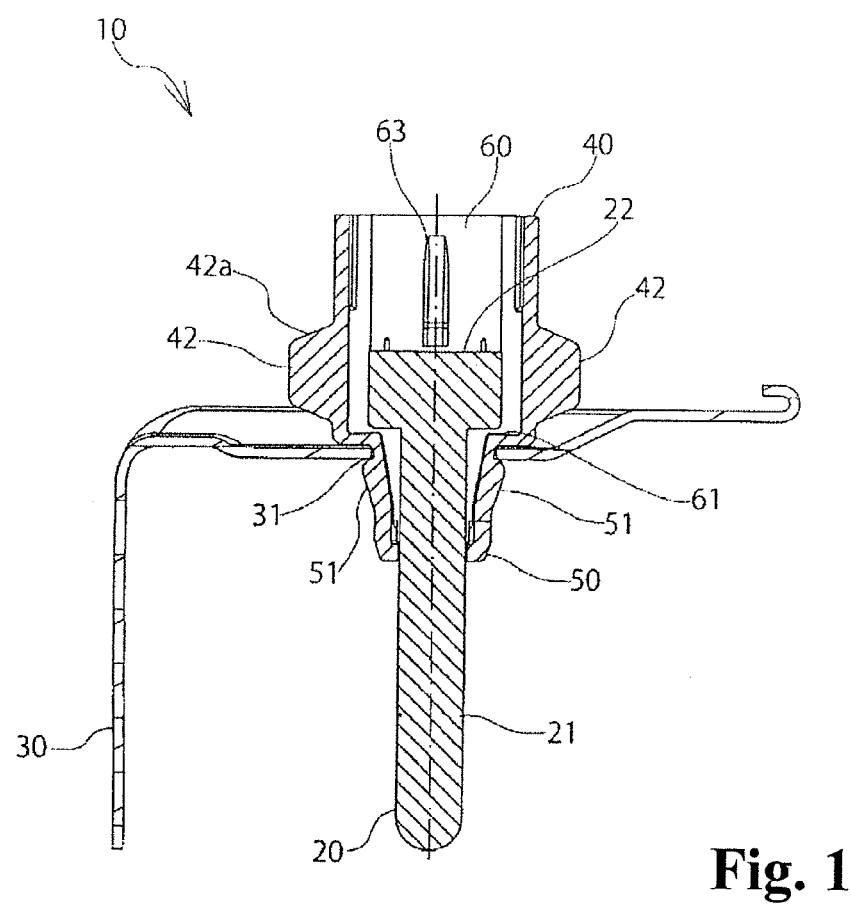
FIG. 1 is a cross-sectional view in a state wherein a temperature sensor is mounted in a battery case through a clip in an embodiment of the present invention.

BEST MODES OF CARRYING OUT THE INVENTION (Clip 10)

In the drawings, the reference symbol 10 represents a clip, and as shown in FIGS. 1 to 6, the clip 10 holds a temperature sensor 20, and is mounted in a mounting hole 31 passing through an inside and outside of a battery case 30 having a case shape in which a battery (not shown in the figures) is housed.

As shown in FIGS. 1, 3, 5, and 6, the clip 10 is mounted in the mounting hole 31 of the battery case 30 in a state of holding the temperature sensor 20.

The clip 10 is integrally formed by thermoplastic synthetic resin having appropriate elasticity and rigidity, for example, POM (polyacetal).

As shown in FIGS. 7 to 13, the clip 10 broadly comprises the following respective portions.

Incidentally, the following (1) to (3) will be described later.

(1) Head portion 40
(2) Leg portion 50
(3) Holding portion 60

Incidentally, each portion of the clip 10 is not limited to the (1) to (3) described hereinabove.

(Battery Case 30)

The battery case 30 is formed in the case shape, and although it is not shown in the figures, the battery is internally housed. As shown in FIGS. 1 to 6, in an outer wall of the battery case 30, there is provided the mounting hole 31 having a circular shape and passing through the inside and outside, i.e., an up-and-down direction in the same figures.

In the mounting hole 31, the later-described leg portion 50 of the clip 10 can be inserted.

Incidentally, although the mounting hole 31 is formed in the circular shape, it is not limited to the circular shape, and may be formed in an oval shape, an elongated circular shape, or a square shape or other polygonal shapes.

Although it is not shown in the figures, the battery is used for an electric car or a hybrid car, and is formed as a module in which a cell is laminated. Although it is not shown in the figures, the battery is equipped in a vehicle in a state of being housed inside the battery case 30. The battery generates heat by an internal electrochemical reaction so as to rise the temperature. When the battery has a high temperature, power generation efficiency of the battery declines, so that the battery is housed inside the battery case 30 having the case shape with high heat conductivity, and coolant air is sent from the outside to cool the battery. In order to control blowing of the coolant air, the temperature inside the battery case 30 is measured by the temperature sensor 20.

(Temperature Sensor 20)

The temperature sensor 20 internally is embedded in a thermistor element.

Figure 2:
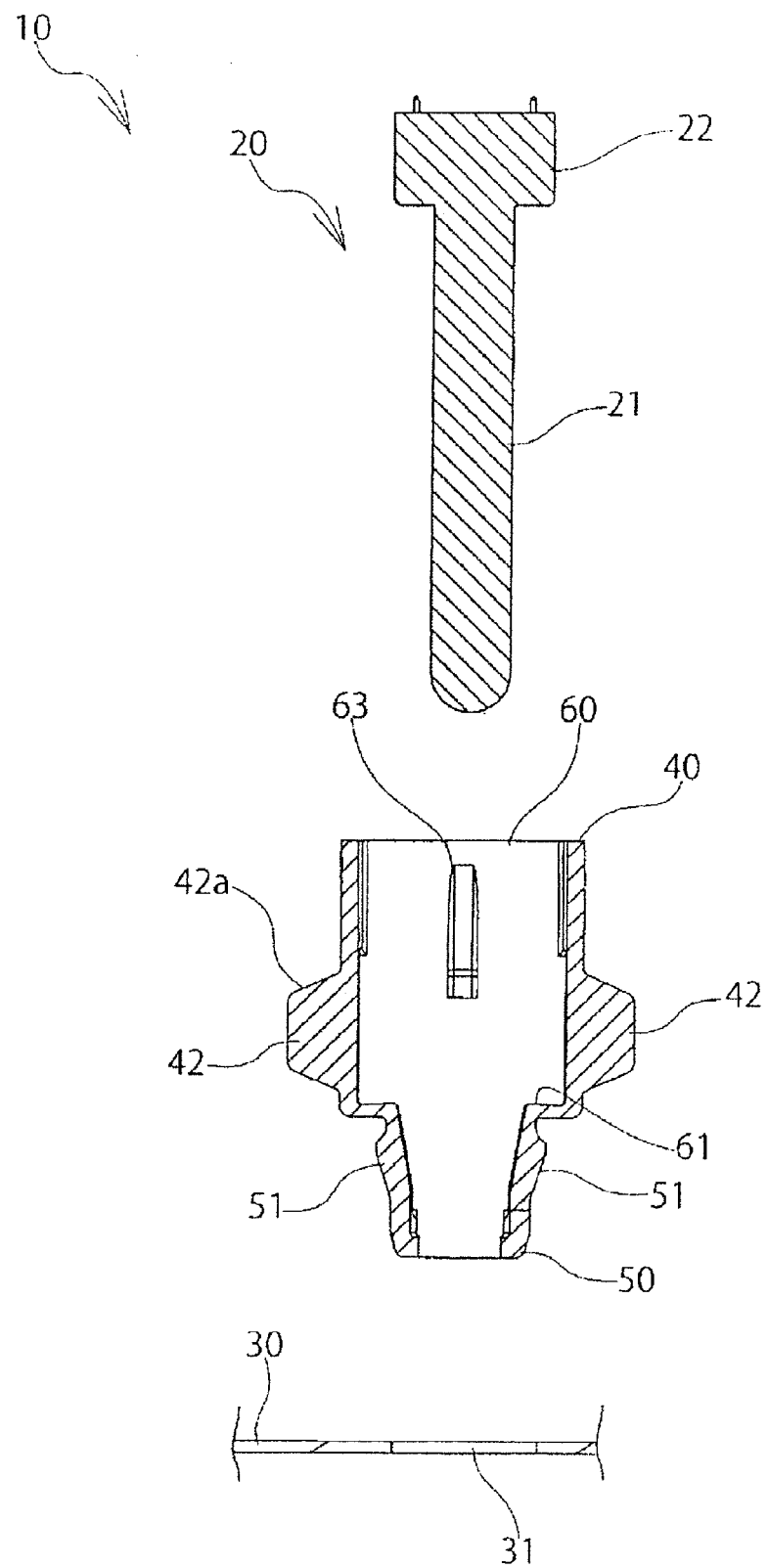
FIG. 2 is a cross-sectional view of the clip, the temperature sensor, and the battery case.
Figure 4:
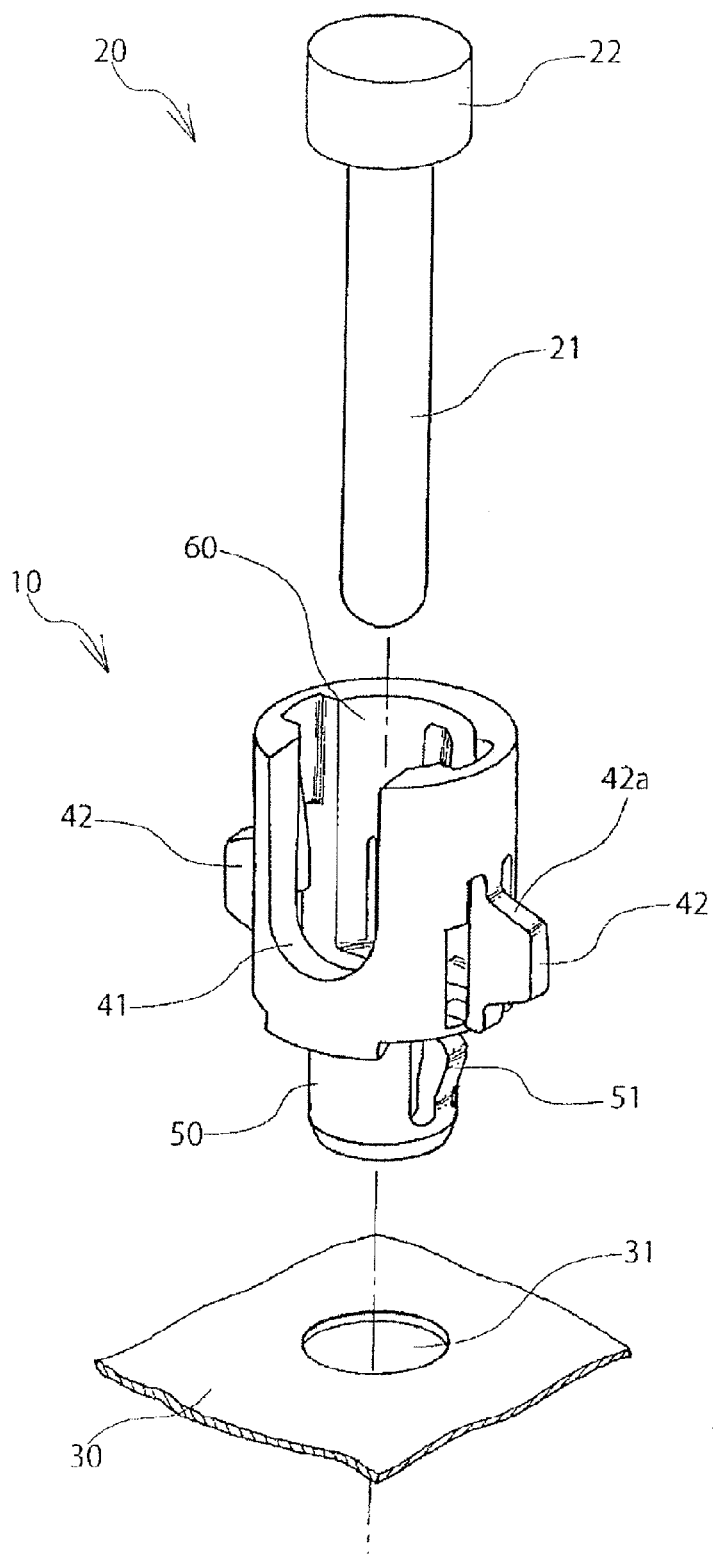
FIG. 4 is a perspective view of the clip, the temperature sensor, and the battery case.

As shown in FIGS. 2 and 4, the temperature sensor 20 includes a sensor main body 21, and a projection portion 22 projecting from the sensor main body 21.

Although it is not shown in the figures, the sensor main body 21 is embedded in the thermistor element, and is formed in a cylinder shape, and an end portion is formed in a hemispheric shape. The projection portion 22 projects approximately in a doughnut shape from a circumference of a base end portion of the sensor main body 21, and an outer diameter of the projection portion 22 is formed larger than an outer diameter of the sensor main body 21.

Incidentally, although the thermistor element is embedded inside the temperature sensor 20, it is not limited to the above.

(Head Portion 40)

Figure 14:
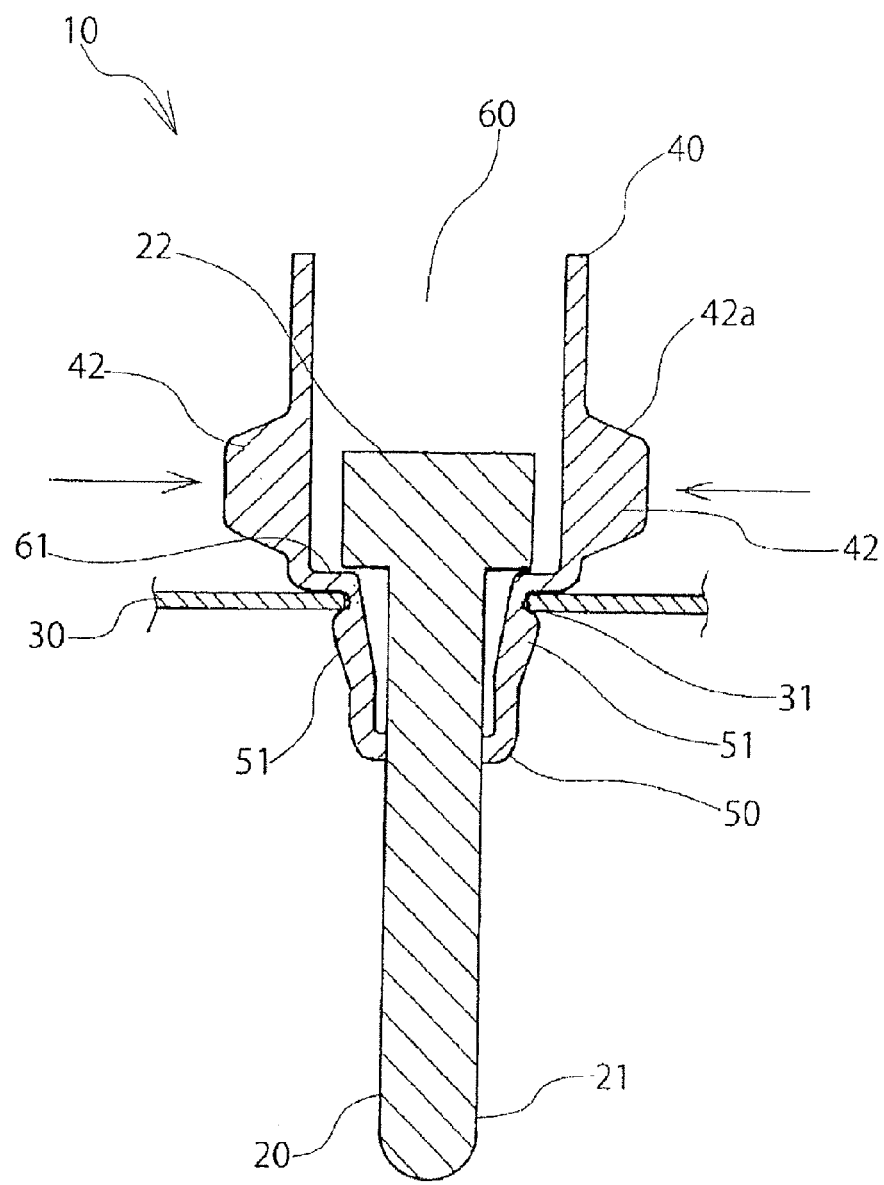
FIG. 14 is a cross-sectional view when the clip is removed from the battery case.

As shown in FIGS. 1 and 14, the head portion 40 is mounted on the mounting hole 31 of the battery case 30 in a state of holding the temperature sensor 20 in cooperation with the later-described leg portion 50 and holding portion 60, and is located on an outer face side of the battery case 30, i.e., on an upper face side in FIG. 1.

As shown in FIGS. 7 to 13, the head portion 40 is formed in a cylinder shape, and an outer diameter of the head portion 40 is set to be larger than an inner diameter of the mounting hole 31 of the battery case 30, and in the present embodiment, the outer diameter of the head portion 40 is set to be approximately equal to the inner diameter of the mounting hole 31 of the battery case 30. Also, an inner diameter of a hollow inside of the head portion 40 is set to be larger than or equal to the outer diameter of the projection portion 22 of the temperature sensor 20, and in the present embodiment, the inner diameter of the hollow inside of the head portion 40, is set to be approximately equal to the outer diameter of the projection portion 22 of the temperature sensor 20.

As shown in FIGS. 7, 9, 10, 12, and 13, the head portion 40 broadly includes the following respective portions.

Incidentally, the following (1) and (2) will be described later.

(1) Slit 41
(2) Operation portion 42

Incidentally, each portion of the head portion 40 is not limited to the aforementioned (1) and (2).

(Slit 41)

As shown in FIGS. 7, 9, 10, 12, and 13, the slit 41 is formed by being notched approximately in a U shape from an upper end portion of the head portion 40.

Incidentally, although the slit 41 is notched approximately in the U shape, it is not limited to the above, and may be formed in a hole shape.

When the temperature sensor 20 is installed inside the holding portion 60, an inner circumference of the hollow inside of the head portion 40 is pressed against an outer circumference of the projection portion 22, and the holding portion 60 can be pushed to open through the slit 41 so as to improve installing ability of the temperature sensor 20, and although it is not shown in the figures, the slit 41 can be used for a wiring of the temperature sensor 20 as well.

(Operation Portion 42)

As shown in FIGS. 7 to 16, the operation portion 42 extends from the later-described engagement portion 51 of the leg portion 50, and can release an engagement of the engagement portion 51 with the case 30. The operation portion 42 is formed as a pair, and is respectively positioned above the later-described pair of engagement portions 51 of the leg portion 50. The operation portion 42 protrudes in a plate shape from an outer circumference of the head portion 40, an upper end portion is connected to a circumferential wall of the head portion 40, and although it is described later, a lower end portion is respectively connected to the pair of engagement portions 51. The operation portion 42 is formed in a trapezoid shape from a lateral view, and the upper end portion is an inclination face 42a obliquely inclining downward.

Figure 15:
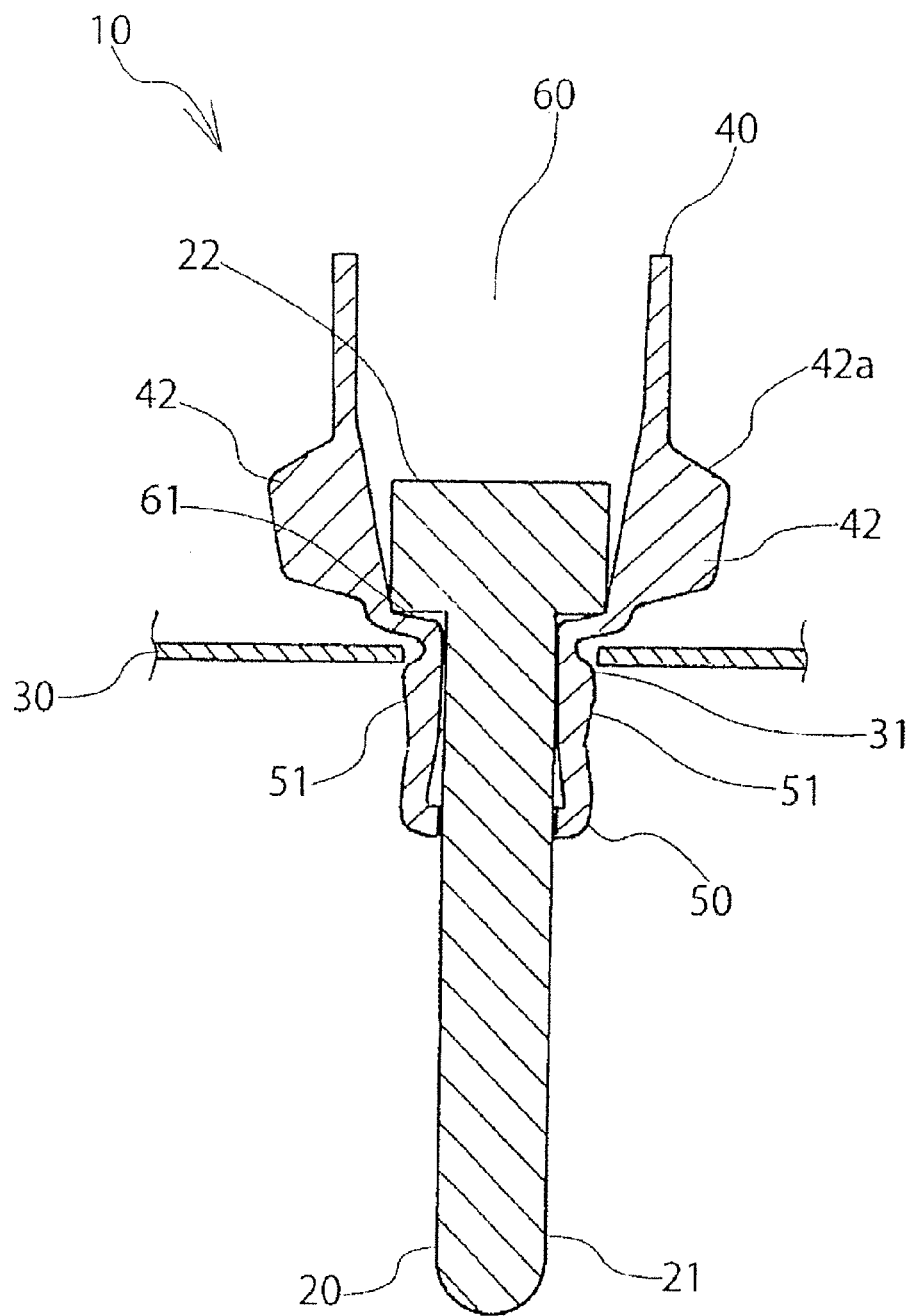
FIG. 15 is a cross-sectional view in a state wherein a pair of operation portions is pinched in the embodiment of the present invention.

As shown in FIG. 15, at a release operation time by the operation portion 42, a connection portion between the operation portion 42 and the engagement portion 51 holds the projection portion 22 of the temperature sensor 20. Namely, as shown by arrows in FIG. 14, the pair of operation portions 42 is pinched inward from both right and left sides. As shown in FIG. 15, when the pair of operation portions 42 is pinched, the later-described step portion 61, which is bent approximately in an L shape or approximately in a V shape, of the holding portion 60 holds the projection portion 22 in such a way as to bite into a lower side of the projection portion 22, i.e., a constricted portion at a boundary line between the projection portion 22 and the censor main body 21.

Consequently, when the clip 10 is removed, in the state of holding the temperature sensor 20, the clip 10 can be removed together with the temperature sensor 20.

Figure 16:
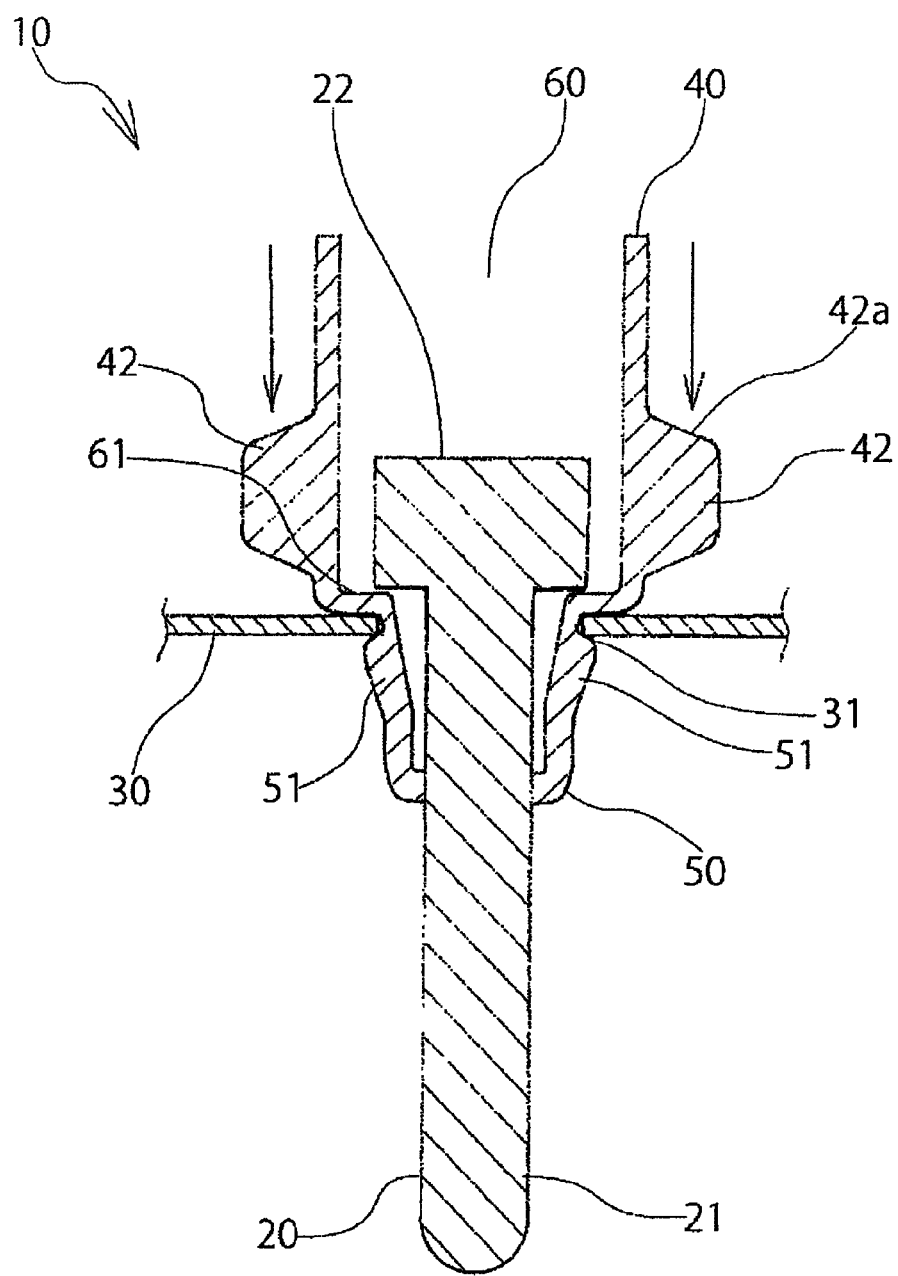
FIG. 16 is a cross-sectional view for explaining a different removal method of the clip corresponding to FIG. 14.

Also, since the inclination face 42a is formed in the upper end portion of the operation portion 42, as shown in FIG. 16, even by pressing the upper end portion of the operation portion 42 toward the battery case 30, in the same manner, the pair of operation portions 42 is moved in a direction of approaching each other so as to hold the projection portion 22. Even in a case wherein there is no space for inserting one's fingers around the operation portion 42 so that the operation portion 42 cannot be pinched, the clip 10 can be removed.

(Leg Portion 50)

As shown in FIGS. 1 to 5, the leg portion 50 hangs from the holding portion 60, can receive the temperature sensor 20 to pass through, and can be inserted into the mounting hole 31.

As shown in FIGS. 7 to 13, as in the case of the head portion 40, the leg portion 50 is formed in a cylinder shape, and an outer diameter of the leg portion 50 is set to be smaller than or equal to the inner diameter of the mounting hole 31 of the battery case 30, and in the present embodiment, the outer diameter of the leg portion 50 is set to be approximately equal to the inner diameter of the mounting hole 31 of the battery case 30. An inner diameter of a hollow inside of the leg portion 50 is set to be smaller than the outer diameter of the projection portion 22 of the temperature sensor 20, and to be larger than or equal to the outer diameter of the sensor main body 21, and in the present embodiment, the inner diameter of the hollow inside of the leg portion 50 is set to be approximately equal to the outer diameter of the sensor main body 21.

As shown in FIGS. 7 to 13, the leg portion 50 includes the following respective portions.

Incidentally, the following (1) will be described later.

(1) Engagement Portion 51

Incidentally, each portion of the leg portion 50 is not limited to the aforementioned (1).

(Engagement Portion 51)

As shown in FIGS. 1 to 5, the engagement portion 51 protrudes from the leg portion 50, and when the engagement portion 51 is inserted into the mounting hole 31, the engagement portion 51 can engage with the case 30.

The engagement portion 51 is formed as a pair, is positioned in a diametrical direction of the head portion 40 having the cylinder shape, and is respectively positioned below the pair of operation portions 42. The pair of engagement portions 51 and the aforementioned slit 41 of the head portion 40 are disposed in an orthogonal direction, and the slit 41 is positioned between the pair of engagement portions 51.

The engagement portion 51 is formed approximately in a triangle shape in a cross section, and an upper end portion becomes a steep inclination face steeply inclining downward, and a lower end portion becomes a gentle inclination face gently inclining downward.

Incidentally, although the engagement portion 51 is formed with two pieces, it is not limited to the above, and may be formed with three pieces or above.

(Holding Portion 60)

As shown in FIGS. 1 to 6, the holding portion 60 can internally receive and hold the temperature sensor 20. The holding portion 60 is positioned at a hollow inside of the clip 10, is formed in a hole shape penetrating from the head portion 40 to the leg portion 50, and opens upper and lower faces.

As shown in FIGS. 7 to 13, the holding portion 60 includes the following respective portions.

Incidentally, the following (1) to (4) will be described later.

(1) Step portion 61
(2) Protrusion 62
(3) Locking portion 63
(4) Notch portion 64

Incidentally, each portion of the holding portion 60 is not limited to the aforementioned (1) to (4).

(Step Portion 61)

As shown in FIGS. 8, 9, 13, and 14, the step portion 61 is positioned in a middle of a height of the holding portion 60, and protrudes toward the center of the holding portion 60 in a step manner, and a bottom face of the projection portion 22 of the temperature sensor 20 is placed on the step portion 61.

(Protrusion 62)

Figure 8:
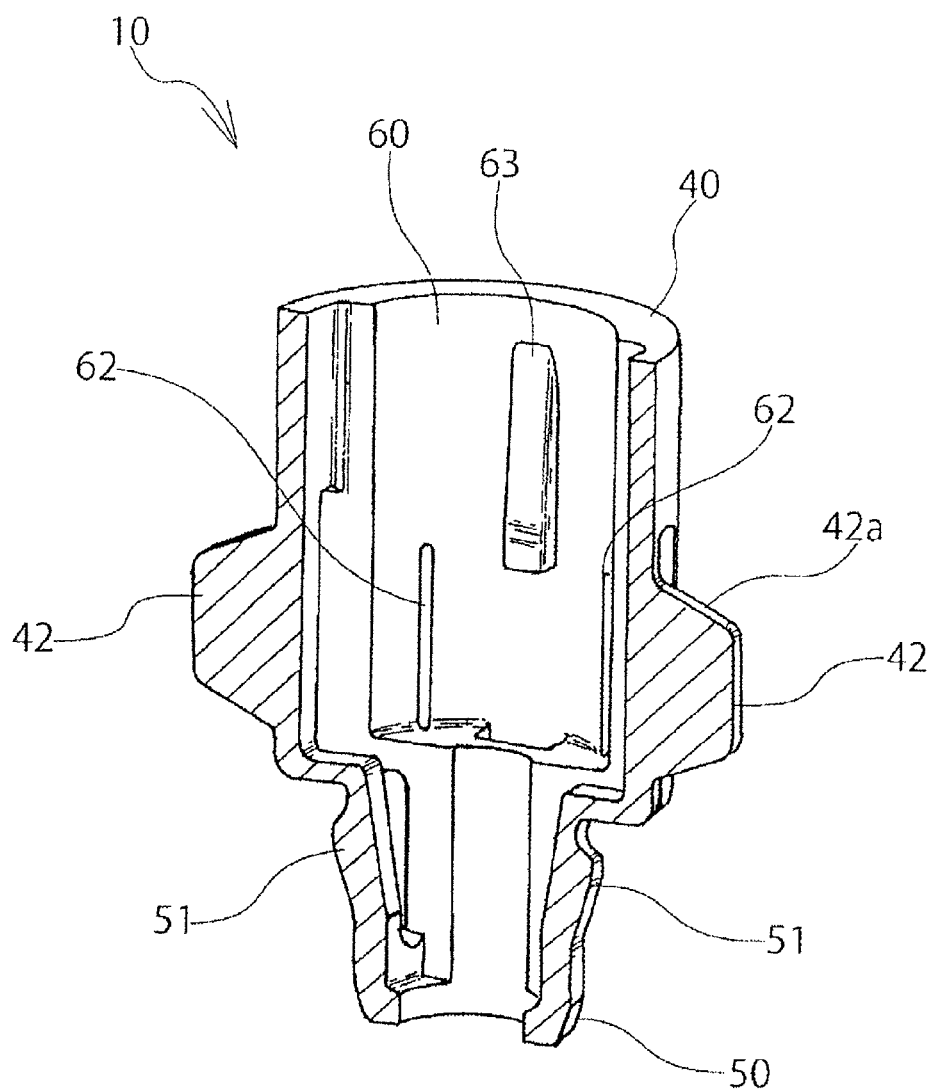
FIG. 8 is a perspective view in a state wherein a half portion of the clip is cut.
Figure 9:
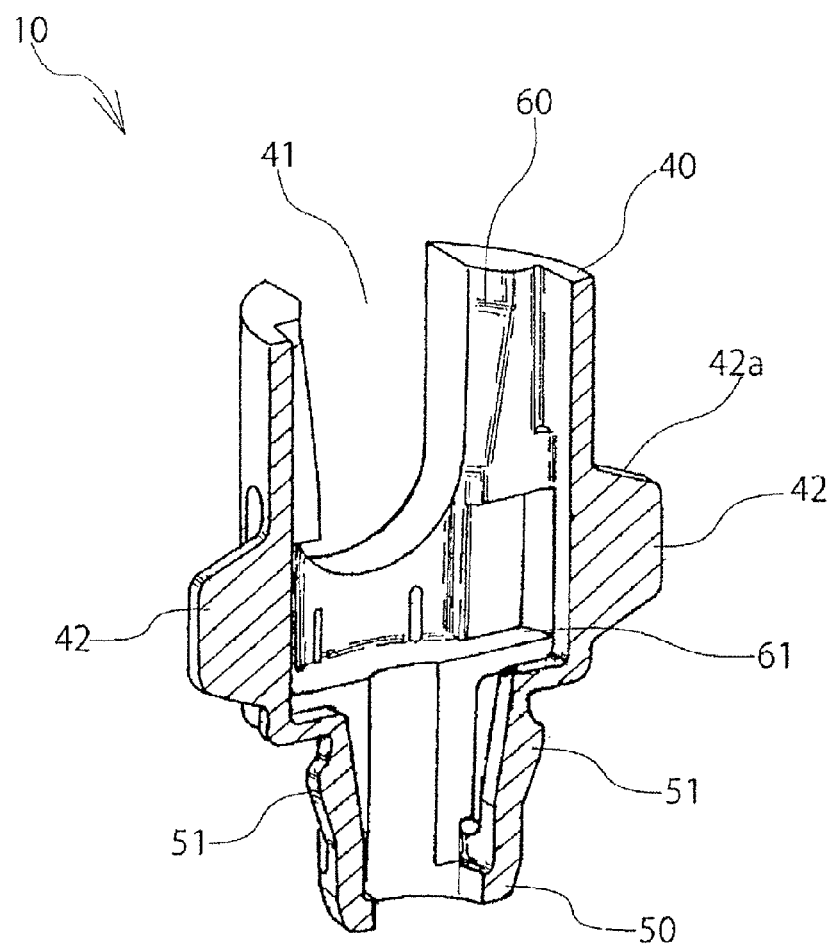
FIG. 9 is a perspective view from a different angle view corresponding to FIG. 8.
Figure 10:
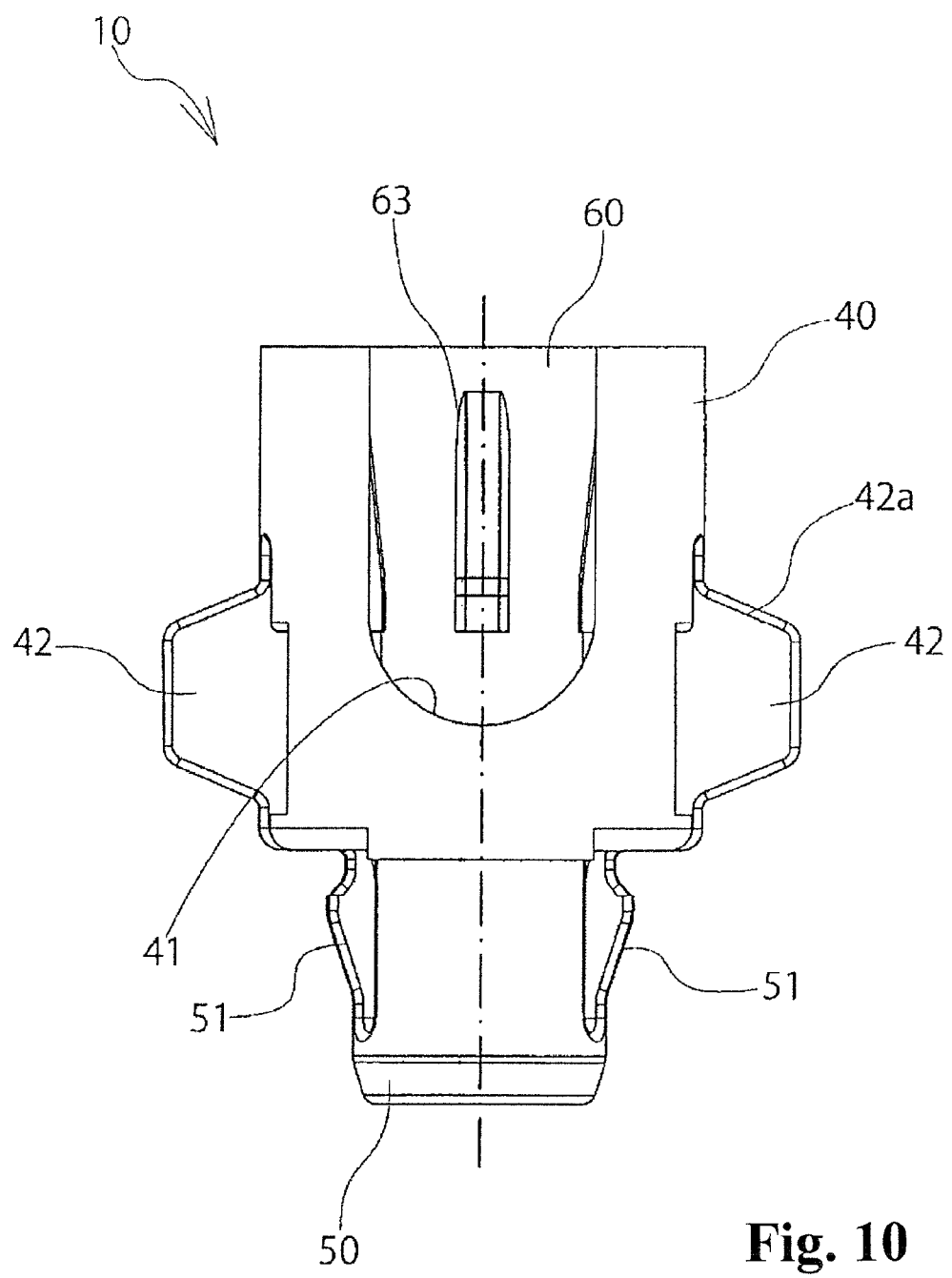
FIG. 10 is a front view of the clip.

As shown in FIG. 8, the protrusion 62 is positioned in an inner circumferential face of the holding portion 60, and extends along an insertion direction of the temperature sensor 20.

Figure 12:
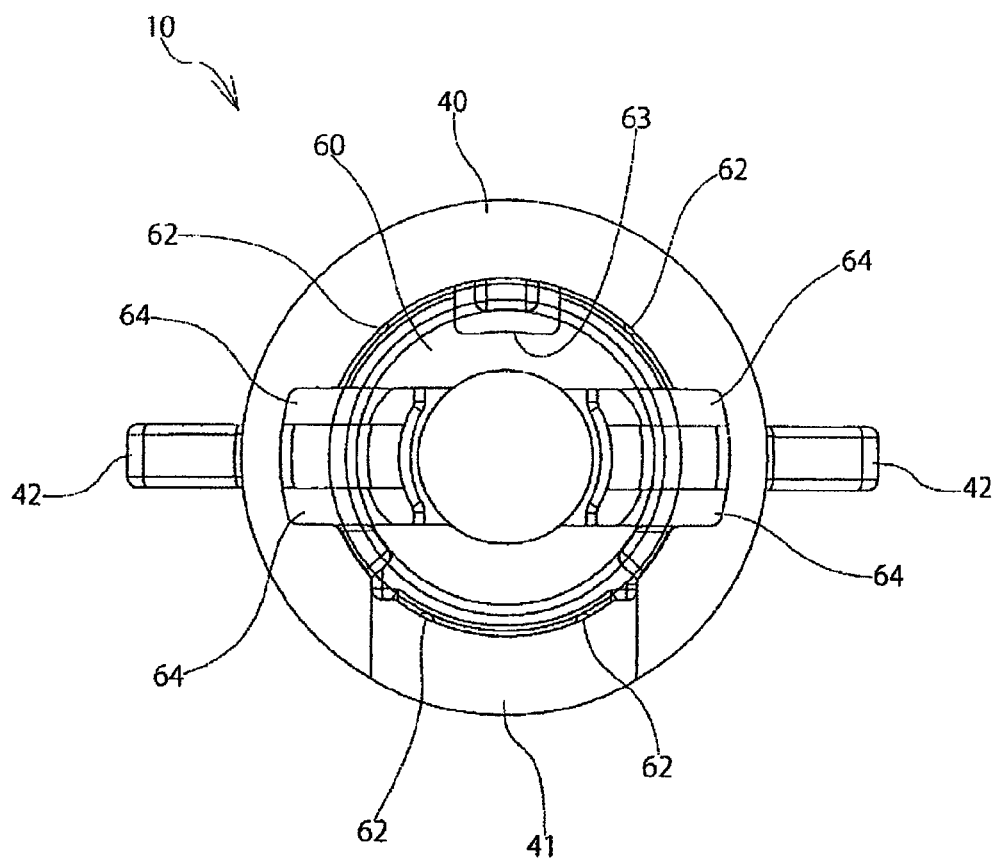
FIG. 12 is a plan view of the clip.
Figure 13:
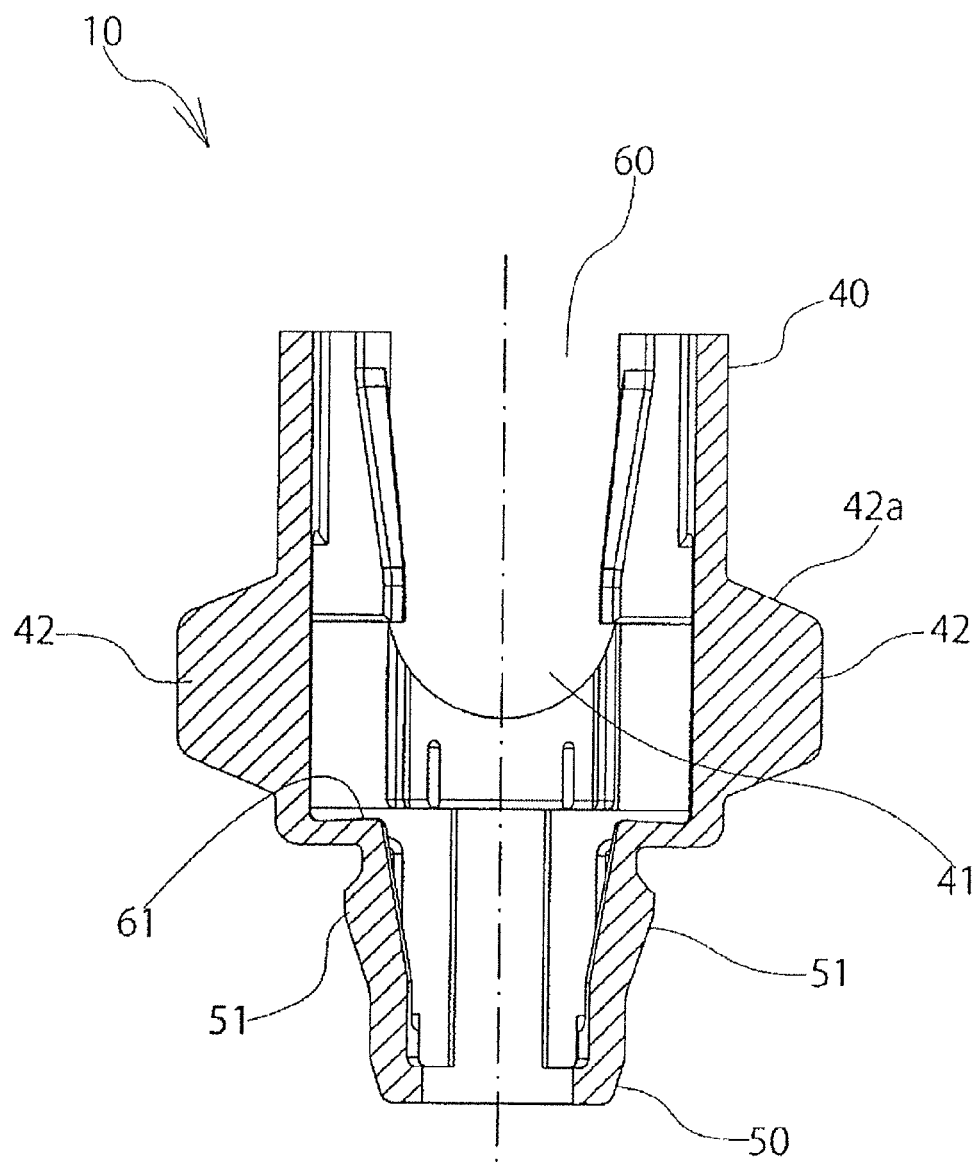
FIG. 13 is a cross-sectional view taken along a line A-A in FIG. 11.

As shown in FIGS. 8 and 12, the protrusion 62 is formed with a plurality of pieces, for example, a total of four pieces, and is formed in a rib shape protruding toward a hollow inside from the inner circumferential face of the holding portion 60. The protrusion 62 is positioned in a lower half portion of the head portion 40, and an upper end portion of the protrusion 62 is positioned in a middle of a height of the hollow inside of the holding portion 60, and a lower end portion of the protrusion 62 connects to the step portion 61.

Incidentally, although the protrusion 62 is formed with four pieces, it is not limited to the above, and may be formed with a single piece, or two, three, or five pieces or above.

When the temperature sensor 20 is inserted into the holding portion 60, the protrusion 62 acts as a guide for the insertion direction by contacting with the outer circumference of the projection portion 22, and after an installation, the protrusion 62 abuts against the outer circumference of the projection portion 22 in the same manner so as to prevent wobbling of the temperature sensor 20 inside the holding portion 60.

(Locking Portion 63)

As shown in FIGS. 1 to 7, the locking portion 63 is positioned in the inner circumferential face of the holding portion 60, and locks the temperature sensor 20.

The locking portion 63 is positioned away from an upper face of the step portion 61 for a distance equal to a height of the projection portion 22 of the temperature sensor 20, and is formed in a claw shape protruding toward the hollow inside of the holding portion 60.

The locking portion 63 is positioned to face the slit 41, and is formed with one piece. The locking portion 63 gradually increases a protruding amount toward a lower end portion, and is formed approximately in a rectangular triangle shape whose inclination face faces obliquely upward.

Incidentally, although the locking portion 63 is formed with one piece, it is not limited to the above, and may be formed with a plurality of pieces.

(Notch Portion 64)

Figure 11:
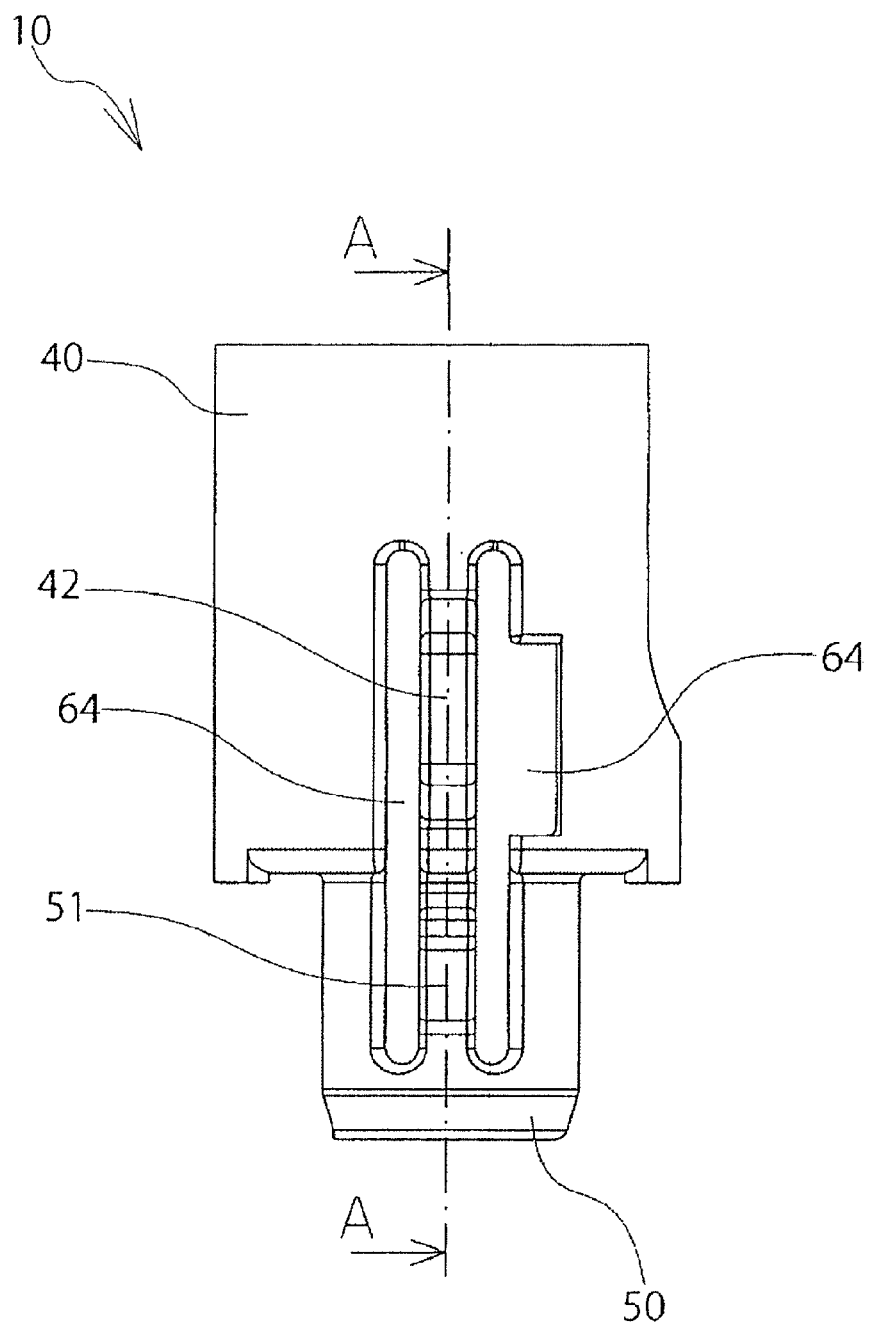
FIG. 11 is a side view of the clip.

As shown in FIGS. 11 and 12, the notch portion 64 is positioned along the operation portion 42 of the head portion 40 and the engagement portion 51 of the leg portion 50 for allowing the operation portion 42 and the engagement portion 51 to easily bend. The notch portion 64 is formed on both right and left sides of the head portion 40 and the leg portion 50 as a pair, passes through inner and outer circumferences of cylinders of the head portion 40 and the leg portion 50, and is formed in a groove shape continuously in the up-and-down direction. By the notch portion 64, the upper end portion of the operation portion 42 becomes a hinge to be connected to an outer wall of the head portion 40. Also, by the notch portion 64, the lower end portion of the operation portion 42 and the upper end portion of the engagement portion 51 are connected. Furthermore, by the notch portion 64, the lower end portion of the engagement portion 51 becomes a hinge to be connected to an outer wall of the leg portion 50.

Incidentally, although the notch portion 64 is formed continuously in the up-and-down direction, it is not limited to the above, and the notch portion 64 may be provided separately from the operation portion 42 of the head portion 40 and the engagement portion 51 of the leg portion 50 so as to be non-continuous.

(Mounting Method of Temperature Sensor 20)

Next, a mounting method of the temperature sensor 20 using the clip 10 with the aforementioned structure will be explained.

The clip 10, in which the temperature sensor 20 is installed, and then held, may be mounted in the mounting hole 31 of the battery case 30, or the clip 10 may be mounted in the mounting hole 31 beforehand, and then, the temperature sensor 20 may be installed relative to the clip 10 fixed in the mounting hole 31.

In an explanation of the present embodiment, the former mounting method will be explained as an example.

First, the temperature sensor 20 is installed in the clip 10.

As shown in FIGS. 2 and 4, the end portion of the sensor main body 21 of the temperature sensor 20 is matched with and inserted into an opening upper face of the holding portion 60 of the clip 10.

When the temperature sensor 20 is inserted, the projection portion 22 is fitted into the hollow inside of the holding portion 60, and an outer circumferential face of the projection portion 22 abuts against the claw-shaped locking portion 63.

Here, when the projection portion 22 is strongly pressed in, the outer circumferential face presses the claw-shaped locking portion 63. Consequently, the holding portion 60 is pushed open through the slit 41, and the inner diameter of the hollow inside of the head portion 40 is expanded so as to allow the projection portion 22 to pass through.

When the projection portion 22 passes through the claw-shaped locking portion 63, the head portion 40 restores to an original state with a snap by a resin elastic restoring force, and the locking portion 63 is caught on an upper face of the projection portion 22, so that the projection portion 22 cannot come out of the opening upper face of the holding portion 60. Also, at that time, a lower face of the projection portion 22 is placed on the upper face of the step portion 61, and the projection portion 22 is sandwiched between the locking portion 63 and the step portion 61 from the up-and-down direction.

Incidentally, when the head portion 40 is restored to the original state, there is generated moderation feeling.

Figure 3:
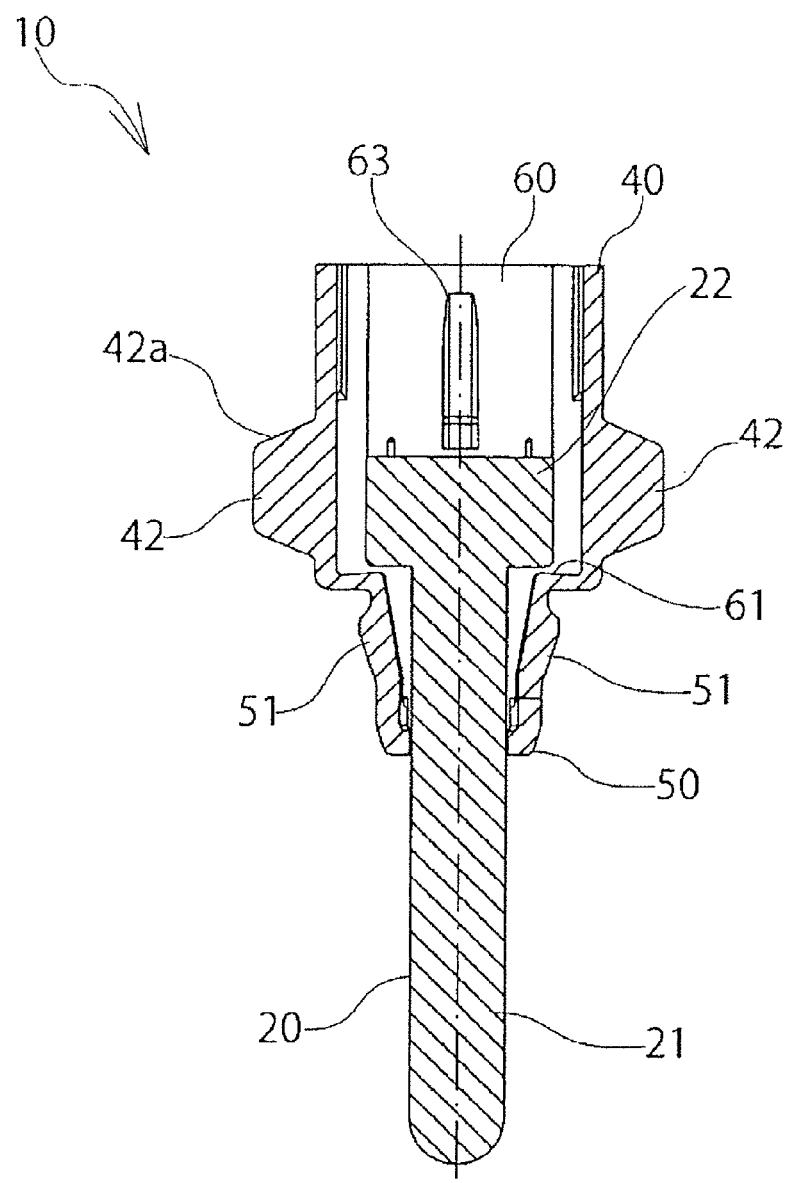
FIG. 3 is a cross-sectional view wherein the temperature sensor is installed in the clip corresponding to FIG. 2.
Figure 3:
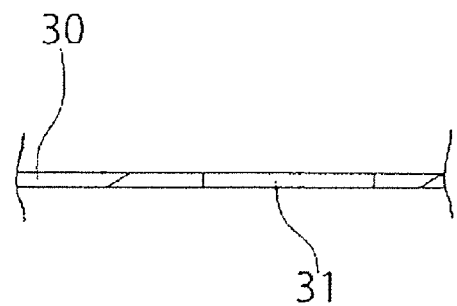
Figure 5:
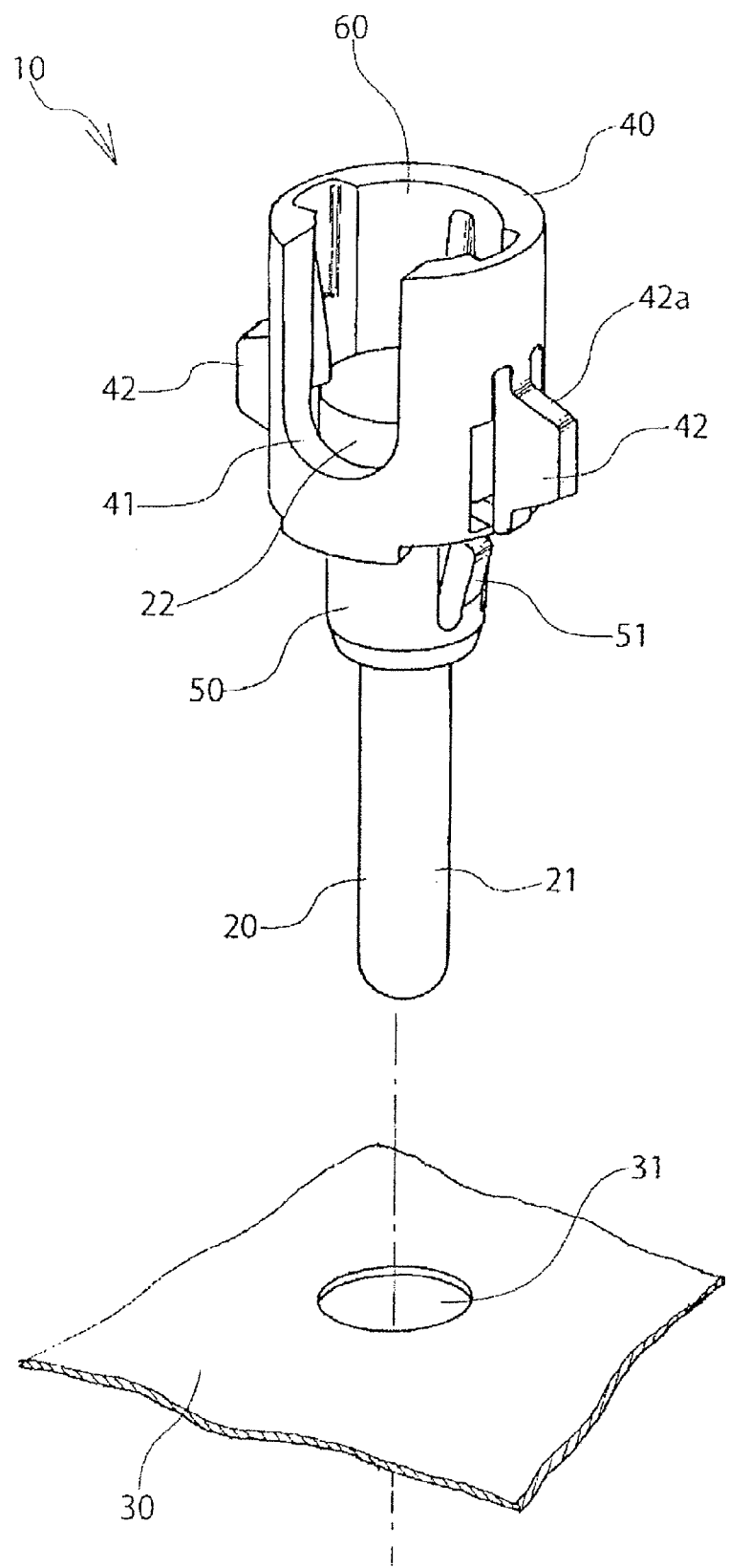
FIG. 5 is a perspective view wherein the temperature sensor is installed in the clip corresponding to FIG. 4.
Figure 6:
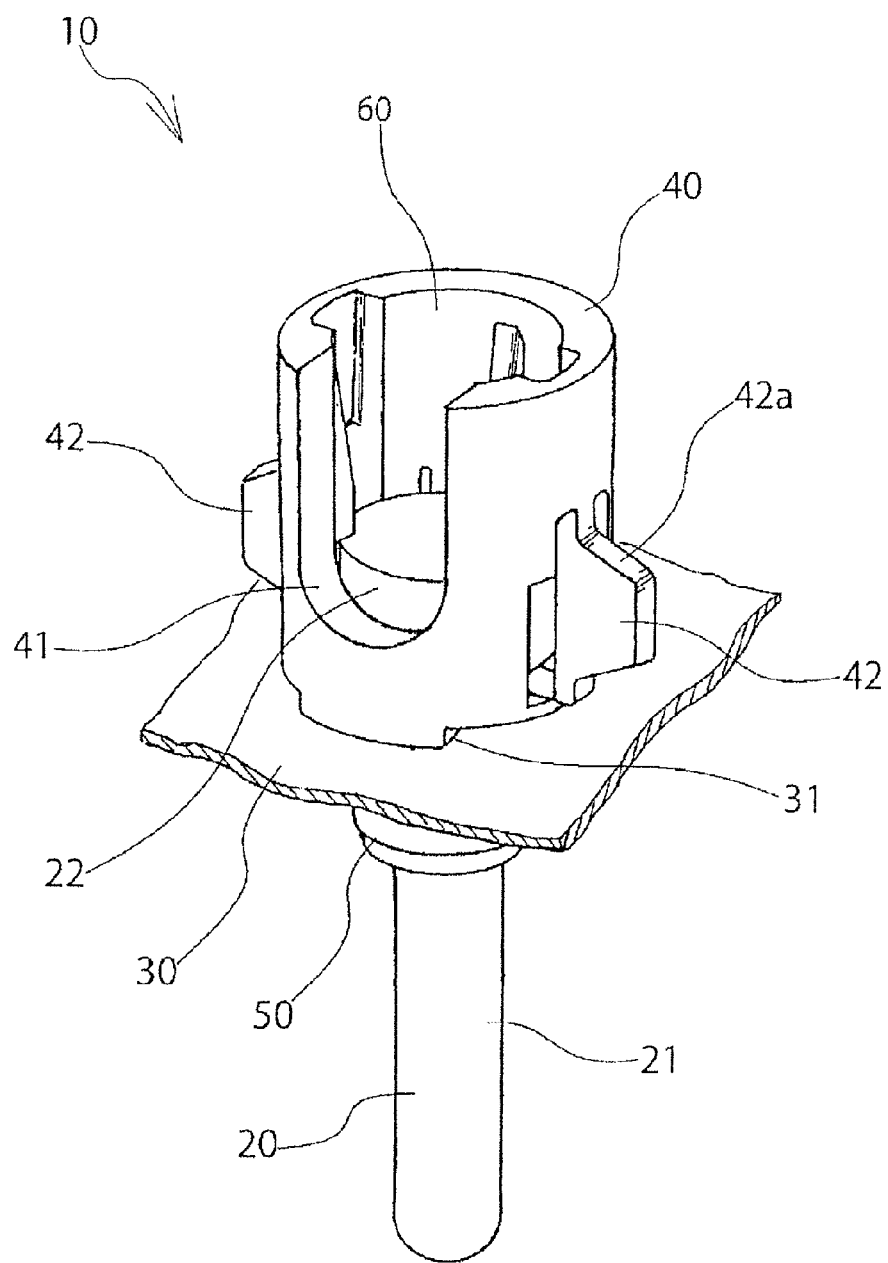
FIG. 6 is a perspective view in a state wherein the clip installing the temperature sensor is mounted in the battery case corresponding to FIG. 4.
Figure 7:
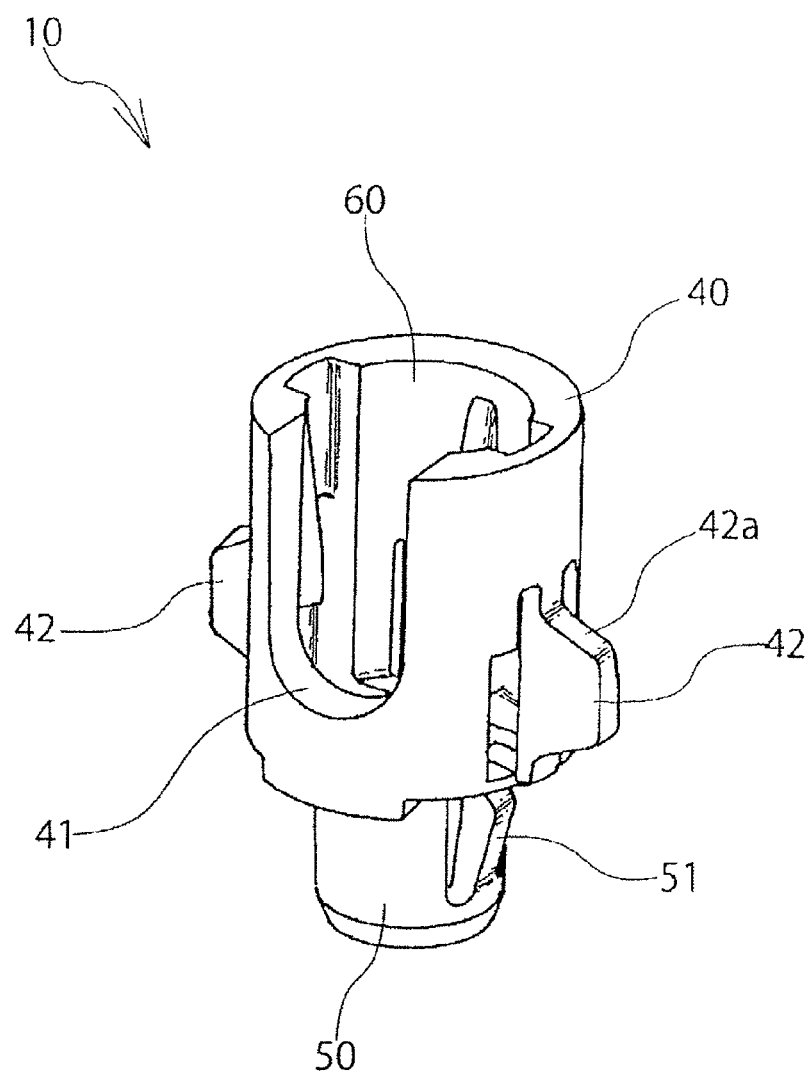
FIG. 7 is a perspective view of the clip.

Also, at that time, as shown in FIGS. 3 and 5, the end portion of the sensor main body 21 of the temperature sensor 20 protrudes from an opening lower face of the holding portion 60.

Next, as shown in FIGS. 3 and 5, the leg portion 50 of the clip 10 holding the temperature sensor 20 is matched with and inserted into the mounting hole 31 of the battery case 30.

When the leg portion 50 is inserted, two engagement portions 51 protruding from a circumference of the leg portion 50 abut against a circumference of the mounting hole 31.

Here, when the leg portion 50 is strongly pressed in, the two engagement portions 51 are pressed by an inner edge of the mounting hole 31, and bend inward in a radial direction of the holding portion 60 so as to allow the two engagement portions 51 to pass through.

When the two engagement portions 51 pass through the mounting hole 31, an inner side of the battery case 30, i.e., in the present embodiment, in the lower side in FIG. 1, by the resin elastic restoring force, the engagement portions 51 restore to an original state and expand a diameter, so that the engagement portions 51 cannot be pulled out upward from the mounting hole 31.

Also, at that time, a lower face of the head portion 40 is placed on an outer face of the battery case 30, i.e., in the present embodiment, an upper face of the upper side in FIG. 1, and the battery case 30 is elastically sandwiched between the lower face of the head portion 40 and the engagement portion 51 from the up-and-down direction.

Thus, as shown in FIG. 1, the temperature sensor 20 is fixed in the mounting hole 31 of the battery case 30 through the clip 10.

(Removal Method of Temperature Sensor 20)

Next, a removal method of the temperature sensor 20 will be explained.

As shown in FIG. 14, when the temperature sensor 20 is removed, the pair of operation portions 42 is pinched inward from both the right and left sides, and in a pinched state, the temperature sensor 20 may be pulled out of the mounting hole 31 of the battery case 30.

As shown in FIG. 15, when the pair of operation portions 42 is pinched, the connection portion between the operation portion 42 and the engagement portion 51 bites into the lower side of the projection portion 22, i.e., the constricted portion at the boundary line between the projection portion 22 and the sensor main body 21.

Consequently, the two engagement portions 51 bend inward in a radial direction so as to reduce the outer diameter of the leg portion 50 and to allow the leg portion 50 to be pulled out of the mounting hole 31.

Also, at that time, the connection portion between the operation portion 42 and the engagement portion 51 holds the projection portion 22 of the temperature sensor 20 so as to allow the leg portion 50 to be pulled out of the mounting hole together with the clip 10 in the state of holding the temperature sensor 20.

On the other hand, since the inclination face 42*a* is formed in the upper end portion of the operation portion 42, as shown in FIG. 16, the upper end portion of the operation portion 42 may be pressed toward the battery case 30.

When the operation portion 42 is pressed up, the pair of operation portions 42 moves in the direction of approaching each other, and bends the two engagement portions 51 inward in the radial direction so as to allow the leg portion 50 to be pulled out of the mounting hole 31.

Incidentally, all contents of the specification, claims, drawings, and abstract of Japanese Patent Application No. 2011-221282 filed on Oct. 5, 2011 are cited in their entireties herein and are incorporated as a disclosure of the specification of the present invention.

What is claimed is:

1. A mounting clip for a battery temperature sensor holding a temperature sensor including a sensor main body and a projection portion projecting from the sensor main body, and mounted to a mounting hole of a battery case, comprising:
    a holding portion allowing the temperature sensor to be internally inserted and held therein;
    a leg portion hanging from the holding portion, allowing the temperature sensor to pass through, to be inserted into the mounting hole;
    an engagement portion protruding from the leg portion, to be engaged with the case when inserted into the mounting hole; and
    an operation portion connected to the engagement portion, and allowing an engagement of the engagement portion with the case to be released,
    wherein at a time of release operation by the operation portion, a connection portion between the operation portion and the engagement portion is adapted to hold the projection portion of the temperature sensor.

2. A mounting clip for a battery temperature sensor according to claim 1, wherein the holding portion includes a slit formed along an insertion direction of the temperature sensor.

3. A mounting clip for a battery temperature sensor according to claim 1, wherein an inner circumferential face of the holding portion includes a protrusion extending along an insertion direction of the temperature sensor.

4. A mounting clip for a battery temperature sensor holding a temperature sensor including a sensor main body and a projection portion projecting from the sensor main body, and mounted to a mounting hole of a battery case, comprising:
    a holding portion allowing the temperature sensor to be internally inserted and held therein;
    a leg portion hanging from the holding portion, allowing the temperature sensor to pass through, to be inserted into the mounting hole;
    an engagement portion protruding from the leg portion, to be engaged with the case when inserted into the mounting hole; and
    an operation portion connected to the engagement portion, and allowing an engagement of the engagement portion with the case to be released,
    wherein an inner circumferential face of the holding portion includes a locking portion locking the projection portion of the temperature sensor.

* * * * *